May 14, 1957 R. N. JANEWAY 2,792,216
FREE PLAY STABILIZER MOUNTING
Filed Oct. 14, 1954
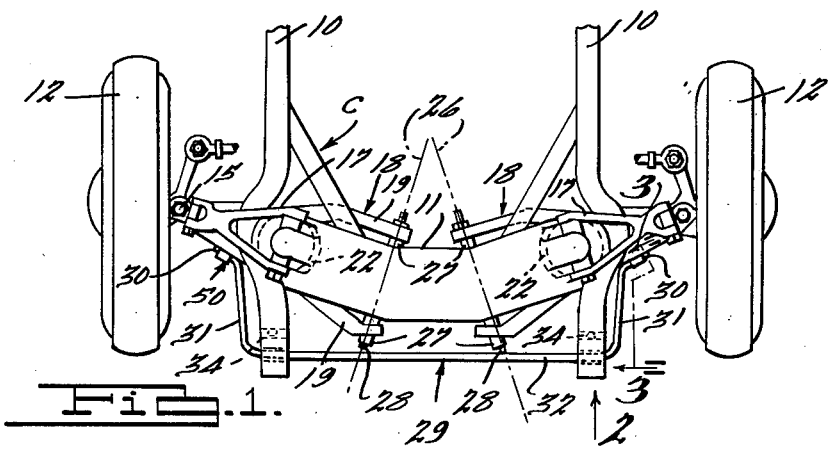
INVENTOR.
Robert N. Janeway
BY
Harness and Harris
ATTORNEYS.

United States Patent Office 2,792,216
Patented May 14, 1957

2,792,216

FREE PLAY STABILIZER MOUNTING

Robert N. Janeway, Detroit, Mich., assignor to Chrysler Corporation, Highland Park, Mich., a corporation of Delaware Application October 14, 1954, Serial No. 462,249

4 Claims. (Cl. 267—11)

This invention relates to motor vehicles having a pair of independently sprung wheels and more particularly to improvements in stabilizing anti-sway bar devices associated with the independently sprung wheels.

An object of the invention is the provision of an improved, simple, economical, and efficient stabilizer or anti-sway device arranged in a novel operative relationship with independently sprung road wheels so as to initially provide a degree of substantially free-play wheel movement between the wheels and stabilizer device in a vertical direction prior to bringing the full effects of the stabilizing device into operation.

A further object of the invention is the provision of an improved connection between a stabilizing bar and the associated independently sprung wheel suspension control arms which connection improves the vehicle ride quality and makes possible the use of a linkless type stabilizer mechanism.

More particularly this invention respects a bowed bar type of stabilizer which bar has the opposite end portions formed as cranks and respectively connected through free-play connections to spaced apart pivotally mounted wheel suspension control arms for movement therewith, said bar having portions intermediate said end portions adapted to resist relative oscillation of the suspension control arms by torsional stress thereof.

It is another object of this invention to provide an improved connection between the crank end of a bowed stabilizer bar and the associated wheel suspension control arm which connection utilizes a resilient element to provide a limited degree of free-play to prevent the transmittal of road disturbances to the structure mounted on the wheels.

Still another object of this invention is the novel connection of the sway bar ends to the associated suspension control arms by means of resilient elements that not only insulate the connected elements but which are so formed that they provide an initial degree of relatively free movement of the control arms in a vertical direction before the anti-sway control effects of the stabilizing bar are brought into operation. This provides improved straightaway ride characteristics of the vehicle body while still retaining the desired anti-sway properties of the sway bar for counteracting roll on curves or the like.

In the application of sway bars to independently sprung wheel suspensions for the purpose of increasing the resistance to body roll on curves, it has been common practice to connect the sway bar to the wheel suspension control arms and to the sprung chassis frame through pre-compressed resilient blocks that substantially prevent any relative movement between the sway bar and its connected elements. This arrangement resists any independent relative movement between the wheels and the sprung mass with the result that the actual deflection rate of the suspension for independent wheel movement on encountering road irregularities during substantially straight road travel is very considerably increased over the deflection rate of the suspension springs alone. The result is that the sway bar tends to transmit more disturbance to the vehicle body and frame than would be the case if the sway bar were omitted. It is the purpose of the sway bar arrangement herein disclosed to reduce the sway bar transmitted disturbances to a minimum by providing a sway bar mounting that gives a limited amount of free wheel motion during which time the sway bar will be inactive while retaining the full effectiveness of the sway bar to resist body roll on curves. Instead of using sway bar mounting blocks formed from resilient solid blocks of rubbers or the like that are pre-compressed in encircling brackets so as to effectively resist any relative motion between the resilient blocks and the brackets, this improved construction includes voids provided in the sway bar mounting blocks that are directly above and below the sway bar bearing portions. These voids permit the sway bar to be displaced vertically for a limited distance in either direction with very little resistance from the resilient mounting blocks which are free to deflect in shear until the resilient material sufficiently fills the voids being acted upon. After filling of the free play void further displacement of the control arm will be opposed by the full torsional resistance of the sway bar. To compensate for the initial free movement of the sway bar due to the mounting voids, the sway bar can be made somewhat heavier so that no loss in total resistance to body roll is introduced. In fact, by use of this type of improved sway bar mounting block in combination with a slightly heavier sway bar, it is possible to get greater restraint against body roll and still improve the straightaway ride on rough roads.

Another desirable result of this type of sway bar mounting is improved control of wheel hop. Wheel hop is the vibration of the unsprung mass between the wheel and the body suspension, including the sway bar, which vibration is ordinarily in the frequency range of 10 to 12 cycles per second or thereabouts. By lowering the initial resistance to independent wheel motion this free play sway bar mounting will reduce the wheel hop frequency and thereby reduce the damping requirement. The suspension vibration damper or shock absorber is called upon to control both the body motion and the independent wheel motion and this necessarily involves some compromise. The lower damping requirement for wheel hop resulting from the use of this type of sway bar mounting will mean better control of wheel motion for a given shock absorber resistance setting.

Other objects and advantages of this invention will be apparent from a reading of the following description taken in connection with the accompanying drawings, wherein:

Fig. 1 is a top plan view of a portion of a motor vehicle chassis that includes independently sprung suspensions for a pair of road wheels which suspensions include a stabilizer device embodying this invention;

Fig. 2 is an enlarged fragmentary side elevational view taken from the front end of the suspension shown in Fig. 1 as indicated by the arrow 2;

Fig. 3 is an enlarged side elevational view taken as indicated by the line 3—3 in Fig. 1; and Fig. 4 is an enlarged fragmentary sectional elevational view taken on the line 4—4 of Fig. 2.

The motor vehicle embodying this invention includes a body supporting chassis frame structure C having spaced side rails 10 connected by a cross member 11. Each of a pair of oppositely disposed road wheels 12 is adapted to have rising and falling movement relative to the chassis frame independently of the other road wheels by reason of the wheel support and guide suspension means which is clearly shown in Fig. 2. Each wheel suspension includes a steering knuckle 13 rotatably journalling the associated wheel 12 by the usual spindle 14.

Steering knuckle 13 is swingably connected by a kingpin 15, that is generally vertically extending, to the knuckle bracket support element 16 that has articulated or pivot connections at its upper and lower ends respectively with the upper and lower generally laterally extending control arm structures 17 and 18. Each of the upper and lower control arms 17 and 18 has an oscillating or pivotal connection with the chassis frame C. A shock absorber or vibration damper 25, of the telescoping type, is secured to each upper control arm structure 17 and to the associated bracket support 16.

Each lower control arm structure 18 is of substantially triangular plan configuration and includes a pair of laterally spaced side components 19. Each control arm side component 19 is formed to provide a portion of substantially channel shaped cross sectional configuration as shown in Fig. 4. Each lower control arm 18 supports a spring seat formation that is designated by the numeral 20. The chassis frame C is springingly supported on each lower control arm 18 by a coil spring 22 that has its lower end engaged with the seat 20 and its upper end mounted in a seat (not shown) formed in the overlying frame cross member 11. A jounce bumper 23 may be mounted on each lower control arm structure 18.

Each lower control arm structure 18 is pivotally connected by bearings 27 to the chassis frame C for oscillation about a substantially horizontally disposed axis that extends generally longitudinally of the chassis frame as indicted by the axes lines 26 of Fig. 1. Each arm to chassis frame pivotal connection 27 has portions fixed to the chassis frame cross member 11 and other portions pivotally mounting the side components 19 of the lower control arms 18. A nipple 28 is provided in each connection 27 to receive a suitable device for forcing lubricant into the pivotal connection.

The stabilizer anti-sway mechanism embodying this invention is of the linkless type and includes a bar 29 that is of bowed or substantially U-shaped plan configuration. This bar 29 has laterally offset opposite end portions 30 that are arranged to extend generally parallel to the forwardly disposed lower control arm side component 19 and which are connected to the lower control arm by the resilient connection 70 that embodies this invention. The bar 29 also includes integral crank or lever arm forming portions 31 which extend forwardly from each bar end portion 30 in a direction substantially longitudinally of the vehicle. The laterally spaced lever arm portions 31 are connected by the elongated bar intermediate body portion 32. The intermediate body portion 32 of the sway bar 29 is supported on the chassis frame side members 10 by means of depending substantially V-shaped brackets 34. Each bracket 34 mounts a resilient block element 33 that includes a bore 36 to receive a bearing part 37 of the bar intermediate portion 32. The resilient bearing blocks 33 are somewhat compressed by their mounting in the brackets 34 and thus provide relatively firm, noise insulating, bearings for the intermediate part 32 of the sway bar.

Each of the sway bar end portions 30 is connected to the forward side component 19 of the associated lower control arm 18 by a free-play connection that embodies this invention. This free play connection comprises a substantially octagon shaped bracket 50 having a pair of oppositely disposed major sides 51, 52 that are connected to the minor sides 53, 54 by the angle sides 55 and 56, and 57 and 58. The major side 51 is connected to a mounting bracket 61 which mounting bracket 61 is fixedly connected to the lower control arm side component 19 by suitable connector means. Mounted within the octagon shaped bracket 50 is a resilient block 70 of rectangular cross sectional configuration. The resilient block 70 is pierced by a cylindrical bore 71 that extends through the center portion of the block. The resilient block 70 is mounted in the bracket 50 so that the bore 71 is aligned with and disposed between the void areas 59 and 60 that are formed at the upper and lower sides of the bracket 50. From a consideration of Fig. 4, it will be noted that a force applied to the bar end portion 30, that has a substantially vertically directed component, will tend to deform the resilient block 70 and cause portions of the block to flow into one or the other of the voids 59 or 60 depending on the direction of the vertically applied force. Thus, when vertically acting forces are initially applied to the sway bar end portions 30, there is initial relative movement between the sway bar end portion and the connected lower control arm 18. This relative motion that results from the flowing of the resilient block portions into the voids of the bracket 50 provides a means for preventing the transmission of road disturbances to the chassis frame C through the wheel supporting linkage. After the resilient block element 70 has been sufficiently deformed to fill one or the other of the voids 59 or 60, then the sway bar end portion 30 is applied directly to the bracket 50 and the connected lower control arm component 19 so that any further movement of the control arm end portion 30 acts upon the lower control arm in a manner that is well known in the art.

The several advantages that result from this free play sway bar end connection have been carefully described in the foregoing description of this invention and it is not thought that repetition of those advantages is required. While the free play sway bar connection 50, 70 has been shown at the connection of the sway bar to the lower control arm, it is within the scope of this invention to use a substantially rigid connection between the sway bar end part 30 and the connected lower control arm component 19 and to provide the free play mounting between the sway bar bearing part 37 and the mounting bracket 34. In such a case the rubber block 33 used to journal the sway bar bearing part 37 would be mounted in a bracket formation similar to the bracket 50 and this bracket would be carried by the bracket 34.

As will be noted from Fig. 2, the stabilizer bar intermediate portion 32 is disposed substantially in the horizontal plane of the lower control arm pivot axis 26. This disposition of the sway bar portion 32 minimizes the tendency of the sway bar lever arm portions 31 to move in response to relative oscillation of the control arm structures 18, thus permitting the use of a simple connection between the sway bar and the control arm structures and avoiding the necessity for connecting links. The sway bar intermediate portion 32 is immediately adjacent the extremity of pivot members 27 so as to maintain the length of the sway bar lever arms 31 at a minimum.

In operation the sway bar 29 acts to prevent tilting or sway of the sprung chassis portion C and in this respect acts on the lower wheel suspension control arms 18 to oppose relative oscillation thereof. For example, as one wheel 12 rises or falls relative to the other, the lower control arm 18 and the bar end portion 30 connected to said one wheel rises or falls and as an incident thereto the bar intermediate portion 32 is torsionally stressed and resists the aforesaid wheel movement by reason of the fact that the other bar lever arm is connected to the lower control arm structure 18 that mounts the opposite road wheel. Thus, if one wheel tends to move relative to the other wheel the sway bar is torsionally stressed so as to resist relative wheel movement. If both wheels tend to move at the same time there will be no tendency for the development of torsional stresses in the sway bar 29 and the suspension will function in a manner similar to one which does not include a sway bar element.

Because of the initial free play movement resulting from the voids 59, 60 in the mounting bracket 50, it is possible to use a somewhat larger diameter sway bar 29 without adversely effecting the deflection characteristics of the spring suspension while at the same time providing increased resistance to body roll at the completion of the free play movement. It has been found that the slight amount of body roll permitted by the free play movement is practically insignificant as compared to the improved riding characteristic resulting from the elimination of road disturbances that result from the free play movement.

The simplicity of this free play sway bar is such that it can be readily incorporated in the present type of sway bar constructions without any major alteration of existing constructions. While the mounting bracket 50 and its supporting bracket 61 are shown as separate elements that are attached to the lower control arm side component 19, it is foreseeable that the mounting bracket 50 could be formed as an integral portion of the lower control arm side component 19 and thus simplify the resilient block mounting and also reduce the space occupied by such a mounting. The noted modifications of the invention are considered to be changes within the skill of a worker in this art and further description thereof is not considered necessary.

I claim:

1. In a vehicle having a load carrying frame with a pair of independently sprung road wheels disposed at opposite sides of said frame, a control arm connected to each wheel extending transversely of said frame and pivotally connected thereto for oscillatory rising and falling movement about an axis extending generally longitudinally of the frame, a resilient element extending between each control arm and said frame, a resilient torsion type stabilizer bar extending transversely of the frame and connected thereto for oscillatory movement about a generally horizontally extending axis that is offset longitudinally of the frame from said control arms, crank means connecting portions of each of the ends of said stabilizer bar to a different one of the control arms, resilient mounting blocks carried by said crank means, said mounting blocks being mounted in control arm supported seats that are spaced from portions of the mounting block peripheries so as to provide voids between certain portions of the mounting blocks and their seats to permit a limited degree of relative vertical movement between the connected portions of the stabilizer crank means and the control arms while substantially restricting relative movement therebetween in other directions.

2. In a vehicle having a load carrying frame with a pair of independently sprung road wheels disposed at opposite sides of said frame, a control arm connected to each wheel extending transversely of said frame and pivotally connected thereto for oscillatory rising and falling movement about an axis extending generally longitudinally of the frame, a spring element extending between each control arm and said frame, a resilient stabilizer bar extending transversely of the frame and pivotally connected thereto for movement about a generally horizontally extending axis, said stabilizer bar having a pair of lever arms projecting therefrom with a lever arm connected to each of said control arms by connecting means that provide for a limited amount of relative movement in a substantially vertical direction between each control arm and the stabilizer lever arm connected thereto, said connecting means comprising a resilient block mounted on the stabilizer bar lever arm and a mounting for said resilient block carried by the associated control arm, said mounting having portions engaging said resilient block to restrict relative movement between the block and mounting in certain directions with other portions of the mounting spaced from the resilient block to permit the resilient block to be deformed on the application of force thereto and provide for a limited degree of relative movement in a vertical direction between the stabilizer bar lever arm and the connected control arm.

3. In a vehicle having a load carrying frame with a pair of independently sprung road wheels disposed at opposite sides of said frame, a control arm connected to each wheel extending transversely of said frame and pivotally connected thereto for oscillatory rising and falling movement about an axis extending generally longitudinally of the frame, a spring element extending between each control arm and said frame, a resilient stabilizer bar extending transversely of the frame and pivotally connected thereto for movement about a generally horizontally extending axis, said stabilizer bar having a pair of lever arms projecting therefrom with a lever arm connected to each of said control arms by connecting means that provide for a limited amount of relative movement in a substantially vertical direction between each control arm and the stabilizer lever arm connected thereto, said connecting means comprising a block of resilient material of substantially rectangular cross sectional configuration mounted on the stabilizer bar lever arm and a bracket mounting for said block of resilient material carried by the associated control arm, said bracket being of such shape that it engages a pair of oppositely disposed sides of said block of resilient material and is spaced from the other pair of oppositely disposed sides of the block of resilient material so as to provide voids between said other pair of oppositely disposed sides of the block and said bracket which voids permit portions of the block of resilient material to be forced therein to provide for a limited degree of relative movement between the stabilizer bar lever arm and the connected control arm in a generally vertical direction.

4. In a vehicle having a load carrying frame member with a pair of independently sprung road wheels disposed at opposite sides of said frame member, a control member connected to each wheel extending transversely of said frame member and pivotally connected thereto for oscillatory rising and falling movement about an axis extending generally longitudinally of the frame member, a spring element extending between each control member and said frame member, a resilient stabilizer bar extending transversely of the frame member having opposite end portions thereof pivotally connected to the frame member for rotary movement about a generally horizontally disposed, transversely extending axis, said stabilizer bar having a lever arm at each end portion with each lever arm connected to one of said control members, the connection of each stabilizer bar end portion to at least one of its attached members including a resilient mounting block of substantially polygonal shape that is supported in a rigid mounting member that has portions thereof normally spaced from certain of the sides of the resilient block mounted therein so as to provide for a limited amount of substantially unrestricted relative vertical movement between the supported stabilizer bar end portion and the member connected thereto by the associated resilient mounting block after which there is an abrupt increase in resistance to deflection of the resilient block to oppose relative vertical movement between the stabilizer bar end portion and the member connected thereto.

References Cited in the file of this patent

UNITED STATES PATENTS

| 2,155,867 | McIntyre | Apr. 25, 1939 |
| 2,517,611 | Utz | Aug. 8, 1950 |
| 2,637,568 | Booth et al. | May 5, 1953 |

FOREIGN PATENTS

| 705,296 | Germany | Apr. 23, 1941 |
| 775,996 | France | Oct. 22, 1934 |